United States Patent [19]
Stimson

[11] Patent Number: 5,856,717
[45] Date of Patent: Jan. 5, 1999

[54] ENCLOSURE FOR AN ELECTRIC MOTOR

[75] Inventor: John R. Stimson, Kings Mountain, N.C.

[73] Assignee: Reliance Electric Industrial Company, Cleveland, Ohio

[21] Appl. No.: 829,763

[22] Filed: Mar. 31, 1997

[51] Int. Cl.$^6$ .................................................. H02K 11/00
[52] U.S. Cl. ........................... 310/71; 310/174; 310/249; 310/439
[58] Field of Search ............................... 310/71, 174, 249

[56] References Cited

U.S. PATENT DOCUMENTS

| | | | |
|---|---|---|---|
| 3,772,453 | 11/1973 | O'Brien | 174/65 SS |
| 4,965,478 | 10/1990 | Kobayashi | 310/249 |

OTHER PUBLICATIONS

30 CFR, Part 18, Jul. 1, 1997 Edition, pp. 86–121.

*Primary Examiner*—Nestor Ramirez
*Assistant Examiner*—Thanh Lam
*Attorney, Agent, or Firm*—William R. Walbrun; John M. Miller; John J. Horn

[57] ABSTRACT

An enclosure for an electrical motor of the explosion proof type, wherein each of the openings for the cable supporting the electrical leads of the motor includes an adapter threadedly received in the opening, and a plug coaxially received in the adapter. The adapter and the plug are retained by means of a C-shaped clamp plate which is releasably fixed directly to the wall of the enclosure and which includes an edge portion which is received in a circumferential groove in the plug. The plug may be solid in cases where it closes the spare lead opening, or it may have an internal passage through which the electrical cable extends.

11 Claims, 2 Drawing Sheets

ENCLOSURE FOR AN ELECTRIC MOTOR

BACKGROUND OF THE INVENTION

The present invention relates to an enclosure for an electrical motor of the explosion proof type, and which incorporates a novel opening structure for the electrical cable.

Electrically operated equipment which is intended for use in coal mines must conform to the strict construction and design requirements of 30 CFR 18.20 et seq to insure safety for its intended use. Among the requirements are those intended to render electrical motors explosion proof in a mine environment, and included in this category are detailed specifications for the openings in the motor enclosure that are provided for the electrical cable entrances. For example, such openings must be of at least a specified length and diameter, and the walls of the openings must be of a specified surface finish.

Presently, the electrical cable openings in motor enclosures include a tubular metal adapter which is threadedly received in the opening of the enclosure, and a tubular cylindrical plug which is coaxially received within the adapter. The cylindrical plug includes an end portion which extends outwardly beyond the wall of the enclosure, and a circumferential groove is positioned in the end portion of the plug. A clamp plate is then positioned so as to be received in the circumferential groove of the plug, and the clamp plate is in turn secured to the outer surface of the adapter by a threaded bolt.

In order to prevent the unintended unthreading and removal of the adapter from the opening, along with the plug and the attached clamp plate, it has been necessary to secure the adapter to the wall of the enclosure by means of external devices, such as bolts, cables, or welding. These external devices cause difficulty in the event the opening or electrical cable is damaged through the rough usage often encountered in mines, and when repair is required. In such cases, it is necessary to first remove the external attachment devices, i.e. the bolts, cables, or welding, which secure the adapter to the wall of the enclosure, and it is then necessary to reattach these devices when the repair is completed. The environment within a mine for conducting these repairs is often confining and dirty, rendering the repair operation tedious and difficult.

Some of the commonly employed attachment devices, such as bolts which are threaded into openings in the enclosure wall, require that the adapter be precisely bottomed to insure that the bolts properly engage the adapter. Such precise buttoning also can be difficult to verify in the field.

It is accordingly an object of the present invention to provide an enclosure for an electrical motor of the explosion proof type which includes electrical cable openings which significantly alleviate the difficulty of making repairs in the field.

SUMMARY OF THE INVENTION

The above and other objects and advantages of the present invention are achieved by the provision of an enclosure which has at least one electrical cable opening in the wall of the enclosure, and wherein a tubular adapter is coaxially disposed in the opening. A cylindrical plug is coaxially received within the tubular adapter and the plug includes an end portion which extends outwardly beyond the outer surface of the wall of the enclosure. A circumferential groove is positioned in the end portion of the plug, and a clamp plate is positioned to overlie the exterior surface of the enclosure wall and the outer surface of the adapter. The clamp plate includes an edge portion which is received in the circumferential groove of the plug, and the clamp plate is releasably connected directly to the exterior surface of the enclosure wall so that the clamp plate retains the adapter and the plug in the opening.

Thus in accordance with the present invention, the clamp plate is joined directly to the enclosure wall, and it retains the adapter and the plug without requiring separate external connecting devices for preventing the removal of the adapter. For this reason, the repair of a damaged opening or electrical cable in the field is greatly simplified.

BRIEF DESCRIPTION OF THE DRAWINGS

Some of the objects and advantages of the present invention having been stated, others will appear as the description proceed, when taken in conjunction with the accompanying drawings, in which.

DETAILED DESCRIPTION OF THE PREFERRED EMBODIMENT

Figure 1:
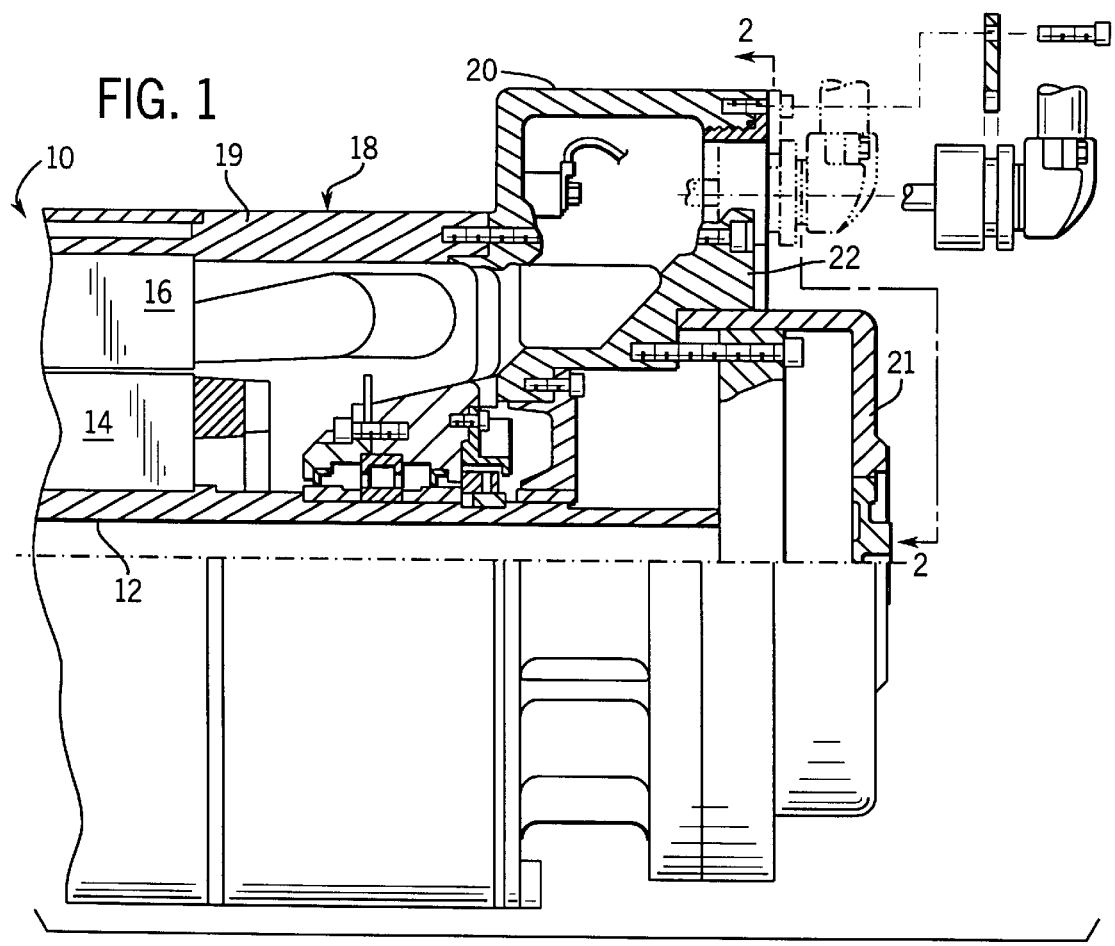
FIG. 1 is a fragmentary, partly sectioned side elevation view of an electrical motor which embodies the present invention.

Referring more particularly to the drawings, an electrical motor of the explosion proof type is indicated generally at 10. The electrical components of the motor are conventional, and they include a drive shaft 12, a laminated cast rotor 14 coaxially mounted to the drive shaft, and a stator 16. The motor also includes an enclosure 18, which includes a tubular casing 19 and a lead-out bracket 20 which is joined to the casing. In the illustrated embodiment, the enclosure also includes a clutch casing 21 joined to the lead-out bracket.

The lead-out bracket 20 of the enclosure includes a wall segment 22 which is disposed generally perpendicular to the axis of the drive shaft 12, and the wall segment 22 includes two electrical cable openings 23, 24. Two such openings are provided to accommodate leads for either right or left hand motor operation, as is conventional. Thus in use, the electrical leads extend through one of the cable openings, i.e. the opening 23 on the right as seen in FIG. 2, and the other non-used opening 24 is closed in the manner described below with respect to FIG. 4.

Figure 2:
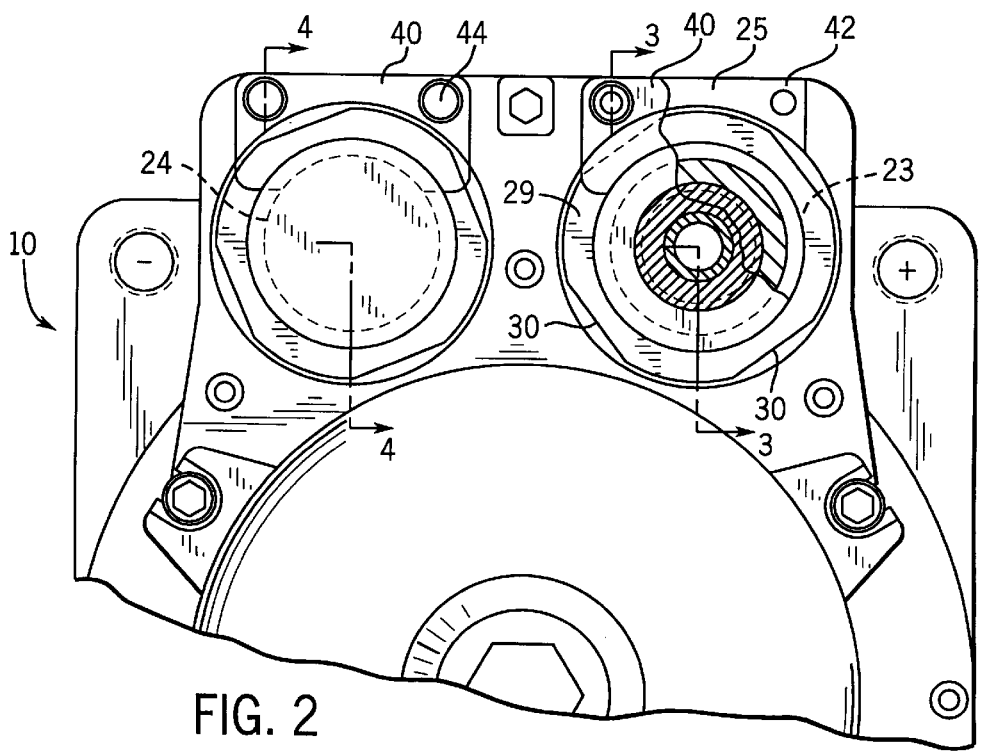
FIG. 2 is a fragmentary and partly sectioned front view of the motor.
Figure 3:
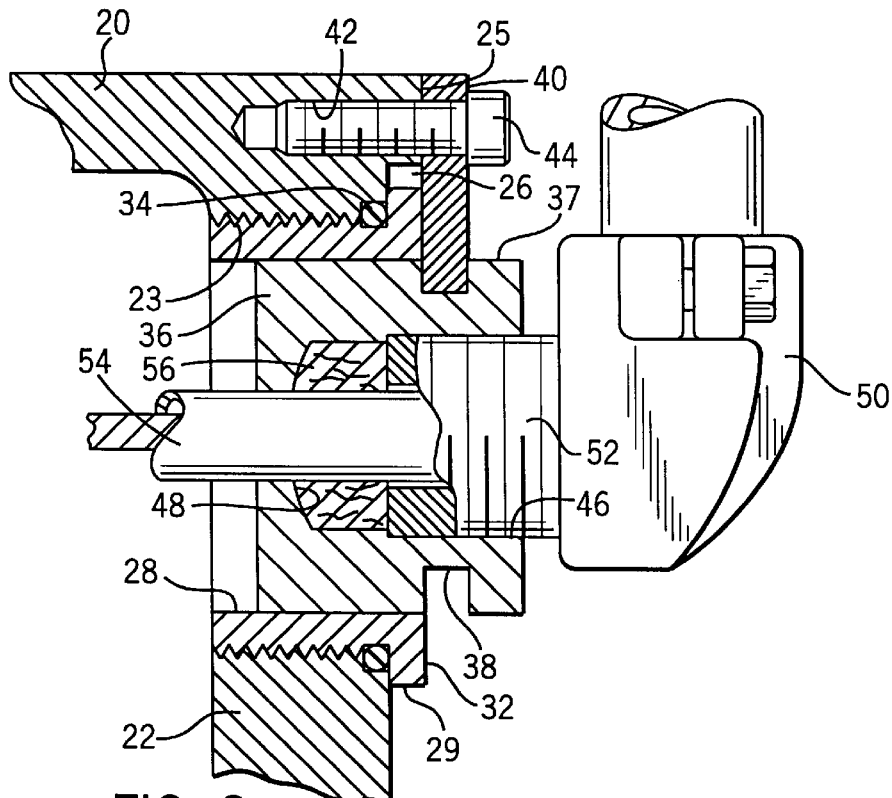
FIG. 3 is a fragmentary sectional view of one of the openings of the enclosure and taken substantially along the line 3—3 of FIG. 2.

As best seen in FIGS. 2 and 3, the wall segment 22 of the lead-out bracket 20 includes a moon-shaped segment which overlies the top of each opening and, which includes a substantially flat outer surface 25. The electrical cable opening 23 extends through the wall segment 22 of the bracket 20 so as to communicate with the flat surface 25. Also, the surface 25 defines a step 26 along the top portion of each opening.

A tubular metal adapter 28 is threadedly disposed in the opening 23 and the adapter 28 includes a radial flange 29 which is received in the step 26. The periphery of the radial flange 29 may include flats 30 as best seen in FIG. 2 to facilitate the threading of the adapter into and from the opening 23. Also, the radial flange 29 defines an outer surface 32 which is at least substantially coextensive with the flat surface 25 of the wall segment 22. To render the connection between the adapter 28 and opening 23 water tight, an O-ring seal 34 is positioned therebetween immediately below the radial flange 29 of the adapter.

A cylindrical metal plug 36 is coaxially received within the tubular adapter 28 and the plug includes an end portion 37 which extends outwardly beyond the flat surface 25 of the wall segment 22. A circumferential groove 38 is positioned in the end portion of the plug so as to be coextensive with the flat surface 25 of the enclosure wall segment. A C-shaped clamp plate 40 is positioned to rest upon the flat surface 25, and so as to overlie the outer surface 32 of the adapter 28, and the clamp plate 40 includes an edge portion which is received in the circumferential groove 38 of the plug 36. Also, means are provided for releasably connecting the clamp plate 40 directly to the flat surface 25 of the wall segment so that the clamp plate retains the adapter 28 and the plug 36 in the opening 23. As illustrated, the connecting means comprises a pair of threaded bores 42 in the enclosure wall, and a pair of bolts 44 which extend through openings in the clamp plate 40 and into respective ones of the bores 42.

The plug 36 includes a central passage extending coaxially therethrough, and the passage includes an internally threaded portion 46 at the outer end portion thereof, as well as an outwardly facing internal shoulder 48 below the threaded portion. A cable supporting elbow 50 is provided which includes an externally threaded tubular sleeve 52 which is threadedly received in the outer end portion 46 of the passage, for supporting the electrical cable 54 which extends through the passage. Also, a packing gland 56 is positioned between the shoulder 48 of the passage and the end of the tubular sleeve 52, for sealably engaging the cable upon being compressed between the shoulder and end of the sleeve.

Figure 4:
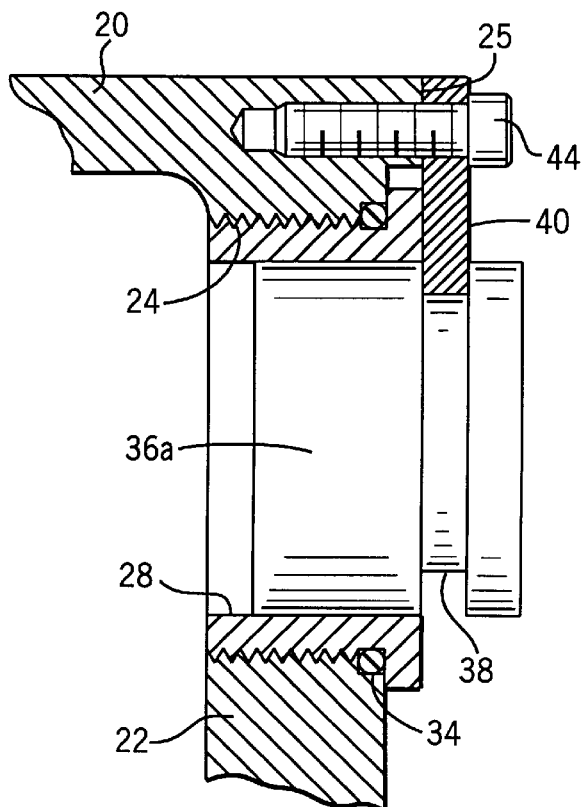
FIG. 4 is a view of a second one of the openings in the enclosure and taken substantially along the line 4—4 of FIG. 2.

The non-used opening 24 in the wall segment 22 of the frame 20 is closed by means of a solid plug 36a, in the manner best seen in FIG. 4. The solid plug is retained by means of a clamp plate 40 which engages a circumferential groove 38 in the plug in the manner described above.

Figure 5:
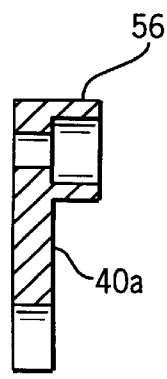
FIG. 5 is a sectional view of an alternative embodiment of the clamp plate.

In the embodiment of FIGS. 3 and 4, the clamp plate 40 is flat, and FIG. 5 illustrates an alternative embodiment at 40a wherein a counterbore forms a sleeve 56 which surrounds each of the two openings. The sleeves 56 thus protectively cover the heads of the bolts 44 which secure the clamp plates to the frame 20, and thereby assist in preventing the inadvertent removal of the bolts 44.

From the above description, it will be apparent that the openings 23, 24 of the motor enclosure of the present invention may be readily repaired in the field by simply removing the clamp plate 40, withdrawing the plug 36 or 36a, and then unthreading the adapter 28. A new adapter may be then threaded into the opening, without concern about the exact bottoming position of the adapter as was often required in the prior designs by reason of the required external connecting devices for securing the adapter. Finally, the plug 36 or 36a may be inserted in the adapter, and the clamp plate then secured to the wall of the enclosure to overlie and retain the adapter, while also locking the plug in its proper position.

In the drawings and specification, there has been set forth a preferred embodiment of the invention, and although specific terms are employed, they are used in a generic and descriptive sense only and not for purposes of limitation.

That which is claimed is:

1. An enclosure for an electrical motor having at least one electrical cable opening extending therethrough, comprising a wall segment having an exterior surface, said one electrical cable opening extending through said wall segment so as to be adjacent said exterior surface, a tubular adapter coaxially disposed in said opening so as to define an outer surface which is adjacent said exterior surface of said wall segment, a cylindrical plug coaxially received within said tubular adapter and including an end portion which extends outwardly beyond said exterior surface of said wall segment, and a circumferential groove positioned in said end portion of said plug, a clamp plate overlying said exterior surface of said wall segment and said outer surface of said adapter, with said clamp plate including an edge portion which is received in said circumferential groove of said plug, and means releasably connecting said clamp plate to said exterior surface of said wall segment so that the clamp plate retains the adapter and the plug in said opening.

2. The motor enclosure as defined in claim 1 wherein said plug is a solid cylinder so as to completely close said opening.

3. The motor enclosure as defined in claim 1 wherein said plug includes a passage extending coaxially therethrough, and further comprising a tubular sleeve threadedly received in an outer end portion of said passage for supporting an electrical cable which extends through said passage.

4. The motor enclosure as defined in claim 3 wherein said passage of said plug includes an outwardly facing internal shoulder, and further comprising a packing gland mounted between said shoulder and said tubular sleeve for sealably engaging the electrical cable.

5. The motor enclosure as defined in claim 1 wherein said tubular adapter is threadedly received in said one opening.

6. The motor enclosure as defined in claim 5 further comprising an O-ring seal between said tubular adapter and said one opening.

7. An enclosure for an electrical motor having at least one electrical cable opening extending therethrough, comprising a wall segment having an exterior substantially flat surface, said one electrical cable opening extending through said wall segment so as to be adjacent the exterior surface and including a step at an outer end of the opening between the opening and the exterior surface, a tubular adapter threadedly disposed in said opening and including a radial flange received in said step, and so that the radial flange defines an outer surface which is at least substantially coextensive with said exterior surface of said wall segment, a cylindrical plug coaxially received within said tubular adapter and including an end portion which extends outwardly beyond said flat surface of said wall segment, and a circumferential groove positioned in said end portion of said plug, a clamp plate overlying said exterior surface of said wall segment and said outer surface of said adapter, with said clamp plate including an edge portion which is received in said circumferential groove of said plug, and means releasably connecting said clamp plate to said exterior surface of said wall segment so that the clamp plate retains the adapter and the plug in said opening.

8. The motor enclosure as defined in claim 7 wherein said plug includes a passage extending coaxially therethrough, with the passage including an internally threaded portion at an outer end portion thereof, and further comprising a tubular sleeve threadedly received in said outer end portion of said passage for supporting an electrical cable which extends through said passage.

9. The motor enclosure as defined in claim 8 wherein said passage of said plug further includes an outwardly facing internal shoulder, and further comprising a packing gland mounted between said shoulder and said tubular sleeve for sealably engaging the electrical cable.

10. The motor enclosure as defined in claim 9 further comprising an O-ring seal between said tubular adapter and said one opening.

11. The motor enclosure as defined in claim 7 wherein said means connecting said clamp plate to said flat surface comprises at least one threaded bore in said wall segment, at least one hole in the clamp plate, and a bolt extending through said one hole and threadedly engaging said one bore.

\* \* \* \* \*